(12) United States Patent
Sehmi

(10) Patent No.: US 12,324,719 B2
(45) Date of Patent: Jun. 10, 2025

(54) DENTAL APPARATUS

(71) Applicant: MAGIC-TRIX LIMITED, West Yorkshire (GB)

(72) Inventor: Prem-Pal Sehmi, Wakefield (GB)

(73) Assignee: MAGIC-TRIX LIMITED, West Yorkshire (GB)

( * ) Notice: Subject to any disclaimer, the term of this patent is extended or adjusted under 35 U.S.C. 154(b) by 578 days.

(21) Appl. No.: 17/611,851

(22) PCT Filed: May 14, 2020

(86) PCT No.: PCT/EP2020/063546
§ 371 (c)(1),
(2) Date: Nov. 16, 2021

(87) PCT Pub. No.: WO2020/234132
PCT Pub. Date: Nov. 26, 2020

(65) Prior Publication Data
US 2022/0192785 A1     Jun. 23, 2022

(30) Foreign Application Priority Data

May 17, 2019   (GB) ...................................... 1907008

(51) Int. Cl.
*A61C 5/85*     (2017.01)
(52) U.S. Cl.
CPC ..................................... *A61C 5/85* (2017.02)
(58) Field of Classification Search
CPC .... A61C 5/80; A61C 5/82; A61C 5/85; A61C 5/88
See application file for complete search history.

(56) References Cited

U.S. PATENT DOCUMENTS

| 3,812,585 | A | | 5/1974 | Balson |
| 3,815,243 | A | | 6/1974 | Eames |
| 3,908,273 | A | * | 9/1975 | Reiter ...................... A61C 5/85 |
| | | | | 433/155 |
| 4,520,833 | A | * | 6/1985 | Hadary .................. A61C 15/02 |
| | | | | 132/328 |

(Continued)

FOREIGN PATENT DOCUMENTS

EP        1219264 A2     7/2002

OTHER PUBLICATIONS

International Search Report and Written Opinion of Application No. PCT/EP2020/063546 dated Oct. 6, 2020 (21 pages).

(Continued)

*Primary Examiner* — Ralph A Lewis
(74) *Attorney, Agent, or Firm* — Michael Best & Friedrich LLP

(57) ABSTRACT

The present invention relates to a clamp (100) for a tooth. The clamp (100) comprises a body (105) for adjustably supporting a band (110) such that a looped section (115) of the band (110) projects from the clamp (100). The clamp (100) further comprises a removable implement (120) configured to adjust a shape of the looped section (115) of the band (110) once the removable implement (120) has been removed from the clamp (100). The clamp (100) comprising the removable implement (120) may be used by a dentist during restorative procedures, e.g. to fill a tooth cavity.

20 Claims, 9 Drawing Sheets

(56) References Cited

U.S. PATENT DOCUMENTS

| | | | | |
|---|---|---|---|---|
| 4,672,986 | A * | 6/1987 | Hadary | A61C 15/02 132/309 |
| 5,055,045 | A * | 10/1991 | Dickie | A61C 5/85 433/155 |
| 5,342,197 | A * | 8/1994 | Stein | A61C 5/85 433/155 |
| 6,234,793 | B1 * | 5/2001 | Brattesani | A61C 5/85 433/149 |
| 6,482,007 | B2 * | 11/2002 | Stanwich | A61C 5/88 433/149 |
| 2005/0158691 | A1 * | 7/2005 | Jabri | A61C 5/85 433/155 |
| 2009/0081606 | A1 * | 3/2009 | Scarazzo | A61C 5/85 433/39 |
| 2014/0356811 | A1 * | 12/2014 | Erskine-Smith | A61C 3/10 433/149 |
| 2019/0060032 | A1 * | 2/2019 | Webster | A61C 5/85 |

OTHER PUBLICATIONS

United Kingdom Intellectual Property Office Action for Application No. GB1907008.5 dated Nov. 5, 2019 (5 pages).

* cited by examiner

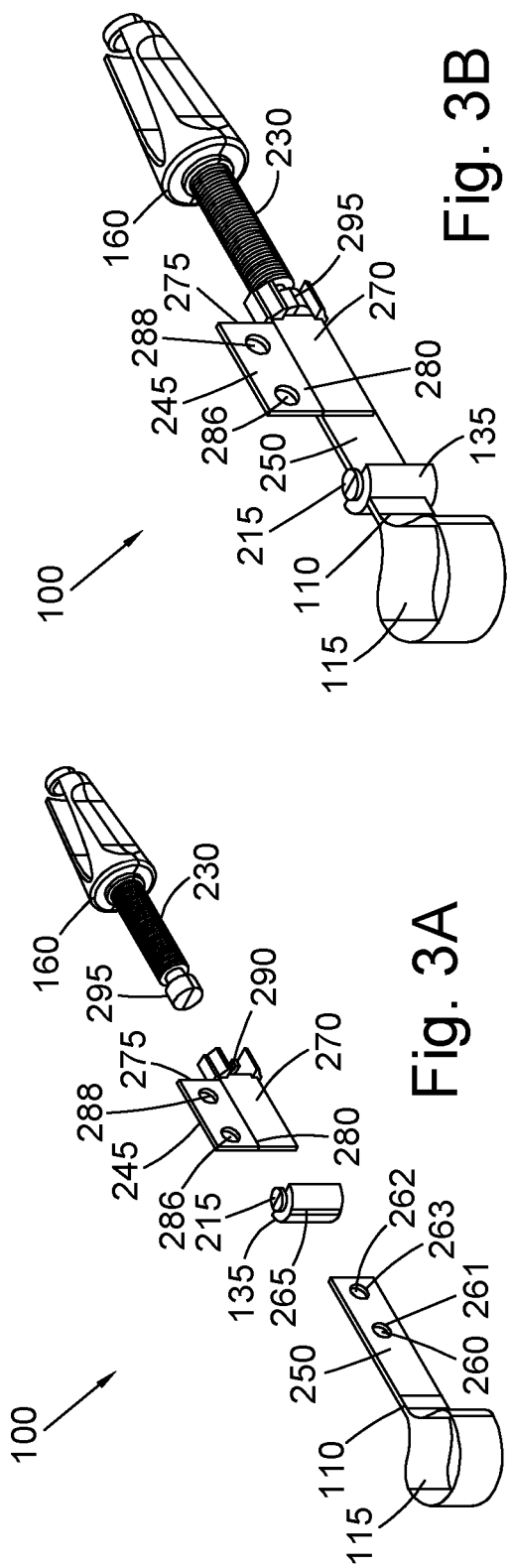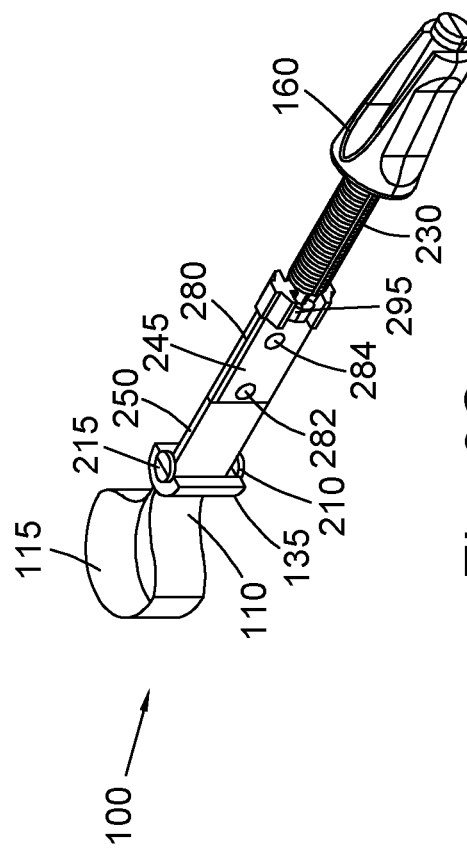

DENTAL APPARATUS

CROSS-REFERENCE TO RELATED APPLICATION(S)

This application is a national phase entry of PCT/EP2020/063546, filed on May 14, 2020, which claims priority to GB 1907008.5, filed on May 17, 2019, the entire contents of which are fully incorporated herein by reference.

FIELD

The present invention relates to a dental apparatus for use by a dentist during a restorative procedure such as treatment of a tooth cavity. More particularly, the present invention relates to a clamp for a tooth. The clamp may be of a type generally referred to as a dental matrix clamp.

BACKGROUND

Dentists typically use a dental apparatus, which may be referred to as a dental matrix clamp, when performing restorative procedures such as, for example, filling a tooth cavity. Known clamps comprise a body which is held in the hand by the dentist and a head from which a looped section of a band projects. The band may be referred to as a matrix band. The band typically comprises a strap formed from a thin sheet of metal having a looped section (formed from a central portion of the strap) which projects from the head of the clamp and a flat section (formed from two opposed end portions of the strap) which is held by the body of the clamp. The looped section of the band is placed around a tooth that is to be treated and an actuator, which is typically provided on the body, is used to alter an extent of the looped section of the band and thereby tighten or loosen the looped section of the band around the tooth. A restorative material such as a dental amalgam or composite may then be introduced between the tooth and a portion of the looped section of the band in order to fill the cavity and restore the tooth.

Some known clamps are reusable and are typically made of metal. These known reusable clamps must be cleaned (e.g. autoclaved) between uses to reduce the risk of contamination and infection. However, contamination and infection are still known to occur through, for example, sharps injuries (i.e. penetration of the skin by a medical instrument) which may be suffered by the dentist when replacing the band of the clamp. The looped section of the band of these known reusable clamps projects from the clamp at a fixed angle resulting in an inflexible device and making it difficult for the dentist to position the looped section of the band around some teeth. Other known clamps are disposable and are typically comprise a body formed from plastic and a metal loop. The disposable nature of these known clamps reduces the risk of contamination and infection compared to the known reusable clamps. Some known disposable clamps comprise a rotatable head that can rotate relative to a main portion of the body. Such an arrangement provides some control over an angle at which the looped section of the band projects from the main portion of the body, which may improve the ease with which the dentist can position the looped section of the band around teeth.

Generally, even once the extent of the looped section of the band has been adjusted to tighten the looped section of the band around a tooth, additional finer adjustments to the shape of the looped section of the band may be desirable to improve a fit of the looped section of the band around the tooth. The shapes, sizes, positions and orientations of teeth differ greatly between different patients. It is desirable to provide a clamp for a tooth that obviates or mitigates one or more problems of the prior art whether identified herein or elsewhere.

SUMMARY

According to a first aspect of the invention, there is provided a clamp for a tooth comprising a body for adjustably supporting a band such that a looped section of the band projects from the clamp, and a removable implement configured to adjust a shape of the looped section of the band once the removable implement has been removed from the clamp.

Currently, separate implements, which may be referred to as wedges, are used during many restorative dental procedures to adapt the shape of the looped section of the band to a patient's tooth. The invention of claim 1 advantageously provides a single product having all implements that may be required by a dentist during such procedures, said implements being quickly and easily accessible. The removable implement may be quickly and easily removed from the clamp and used to improve a fit of the looped section of the band around the tooth, which would not be possible using known clamps.

The clamp may be known in the art as a dental matrix clamp or dental matrix retainer. The band may be known in the art as a dental matrix band. The clamp may be disposable and/or reusable.

The removable implement may taper at one end for insertion of the removable implement between a tooth and the looped section of the band.

The removable implement may be referred to as a wedge. Wedges are the preferred implement used by dentist for procedures involving a dental matrix clamp. The tapered removable implement advantageously assists the dentist with adapting the looped section of the band around the patient's tooth so a desired fit can be achieved.

The removable implement may have a length of between about 1 cm and about 5 cm.

This range of lengths of removable implement advantageously provides the greatest flexibility to the dentist when using the clamp whilst also ensuring that the clamp does not become too large or bulky thereby potentially hindering the actions of the dentist during use. The term "length" may be understood to mean the greatest of the three dimensions of the removable implement.

The clamp may further comprise an actuator configured to alter an extent of the looped section of the band. The removable implement may form part of the actuator.

The removable implement may be an integral part of the actuator. The actuator may comprise a handle connected to a screw. Rotation of the screw in a first rotational direction may increase an extent of the looped section of the band (i.e. increase a perimeter of the looped section of the band), thereby allowing the looped section of the band to fit around larger teeth. Rotation of the screw in an opposite rotational direction may reduce an extent of the looped section of the band (i.e. decrease a perimeter of the looped section of the band), thereby allowing the looped section of the band to fit around smaller teeth. The actuator may house the removable implement within an internal space of the actuator. Available internal space of the body of the clamp may be limited due to the body of the clamp already housing other components, e.g. the band and the screw of the actuator. The actuator may have a larger amount of available internal space to accommodate the removable implement without reducing the structural robustness of the clamp.

The removable implement may be connected to the clamp by a breakable connector.

The breakable connector advantageously provides a simple and quick way of detaching the removable implement from the clamp for use during a dental procedure. The simplicity of the breakable connector advantageously increases an ease with which the clamp may be manufactured.

The clamp may further comprise a head that is rotationally connected to the body by an interference fit, the head comprising a slot through which the looped section of the band projects, wherein the interference fit is arranged to maintain the head at any one of: a centred position in which the looped section of the band projects from the slot in a direction that is substantially parallel to a length of the body; and a plurality of angular positions in which the looped section of the band projects from the slot in a direction that is not substantially parallel to the length of the body, wherein the interference fit is arranged such that the head may be maintained in at least two different angular positions on at least one side of the centred position.

The shape, size, position and orientation of teeth vary greatly between different patients. The interference fit advantageously provides greater flexibility of use of the clamp by offering a greater number of rotational positions of the head. The interference fit increases a dentist's ability to adapt the looped section of the band to different patients' teeth and thereby improves the ease with which the clamp may be used compared to known clamps.

The interference fit may comprise a faceted pin, wherein different facets on the faceted pin correspond to different angular positions of the head.

The faceted pin may be a prism with a cross-section that is a polygon such as a pentagon, a hexagon, a heptagon, an octagon, etc. In general, a greater number of facets on the pin corresponds to a greater number of available angular positions of the head, thereby improving the adaptability and ease of use of the clamp.

The interference fit may comprise a substantially circular pin which allows the head to rotate across and remain at any one of a substantially continuous range of angles between about −90° and about +90° relative to the body.

The circular pin arrangement advantageously provides the greatest degree of adaptability and ease of use of the clamp.

The interference fit may be formed by components that comprise polypropylene.

Polypropylene has been found to be particularly effective in providing a suitable interference fit between the body and the head. That is, polypropylene provides enough friction such that the head will remain in any rotational position it is placed in by a user but not too much friction such that the head may be moved between different angular positions by a user.

According to a second aspect of the invention, there is provided a clamp for a tooth comprising a body for adjustably supporting a band such that a looped section of the band projects from the clamp, and a head that is rotationally connected to the body by an interference fit, the head comprising a slot through which the looped section of the band projects, wherein the interference fit is arranged to maintain the head at any one of: a centred position in which the looped section of the band projects from the slot in a direction that is substantially parallel to a length of the body; and a plurality of angular positions in which the looped section of the band projects from the slot in a direction that is not substantially parallel to the length of the body, wherein the interference fit is arranged such that the head may be maintained in at least two different angular positions on at least one side of the centred position.

Known clamps either comprise a head that is fixed relative to the body or a rotatable head that is only able to move between three discrete locked positions relative to the body: a centred position, a clockwise position and an anti-clockwise position. The rotational freedom of the head of the known disposable clamps may be limited to no rotation or these three discrete locked positions, thereby restricting freedom of use of the clamp by the dentist. The interference fit advantageously provides greater flexibility of use of the clamp by offering a greater number of rotational positions of the head compared to known clamps. The interference fit increases the dentist's ability to align the looped section of the band to different patients' teeth and thereby improves the ease with which the clamp may be used compared to known clamps.

The body may be an elongate body, which may define an axis. The length may be a dimension of the body parallel to the axis.

The interference fit may comprise a substantially circular pin which allows the head to rotate across and remain at any one of a substantially continuous range of angles between about −90° and about +90° relative to the body.

The clamp may further comprise a removable implement configured to adjust a shape of the looped section of the band once the removable implement has been removed from the clamp.

The removable implement may taper at one end for insertion of the removable implement between a tooth and the looped section of the band.

According to a third aspect of the invention, there is provided a kit of parts comprising a clamp according to the first or second aspects of the invention and a band configured to be attached to the clamp.

According to a fourth aspect of the invention, there is provided a method of manufacturing a clamp for a tooth, the clamp comprising a body for adjustably supporting a band such that a looped section of the band projects from the clamp, the method comprising forming a removable implement as part of the clamp, the removable implement being configured to adjust a shape of the looped section of the band once the removable implement has been removed from the clamp.

The method may further comprise tapering the removable implement at one end for insertion of the removable implement between a tooth and the looped section of the band.

The method may further comprise injection moulding the clamp and the removable implement.

The method may further comprise forming a breakable connector between the removable implement and the clamp.

The method may further comprise forming a head that is rotationally connected to the body by an interference fit, the head comprising a slot through which the looped section of the band projects, wherein the interference fit is arranged to maintain the head at any one of: a centred position in which the looped section of the band projects from the slot in a direction that is substantially parallel to a length of the body; and a plurality of angular positions in which the looped section of the band projects from the slot in a direction that is not substantially parallel to the length of the body, wherein the interference fit is arranged such that the head may be maintained in at least two different angular positions on at least one side of the centred position.

Using an interference fit may comprise providing a substantially circular pin which allows the head to rotate across and remain at any one of a substantially continuous range of angles between about −90° and about +90° relative to the body.

The method may further comprise using components that comprise polypropylene to form the interference fit.

According to a fifth aspect of the invention, there is provided a method of manufacturing a clamp for a tooth, the clamp comprising a body for adjustably supporting a band such that a looped section of the band projects from the clamp, the method comprising forming a head that is rotationally connected to the body by an interference fit, the head comprising a slot through which the looped section of the band projects, wherein the interference fit is arranged to maintain the head at any one of: a centred position in which the looped section of the band projects from the slot in a direction that is substantially parallel to a length of the body; and a plurality of angular positions in which the looped section of the band projects from the slot in a direction that is not substantially parallel to the length of the body, wherein the interference fit is arranged such that the head may be maintained in at least two different angular positions on at least one side of the centred position.

Using an interference fit may comprise providing a substantially circular pin which allows the head to rotate across and remain at any one of a substantially continuous range of angles between about −90° and about +90° relative to the body.

The method may further comprise using components comprising polypropylene to form the interference fit.

The method may further comprise forming a removable implement as part of the clamp, the removable implement being configured to adjust a shape of the looped section of the band once the removable implement has been removed from the clamp.

BRIEF DESCRIPTION OF THE DRAWINGS

Embodiments of the invention will now be described, by way of example only, with reference to the accompanying schematic drawings, in which:

FIG. 3, consisting of FIGS. 3A-3C, schematically depicts perspective views of some of the components of the clamp of FIG. 1 at different stages of construction;

DETAILED DESCRIPTION

Figure 1:
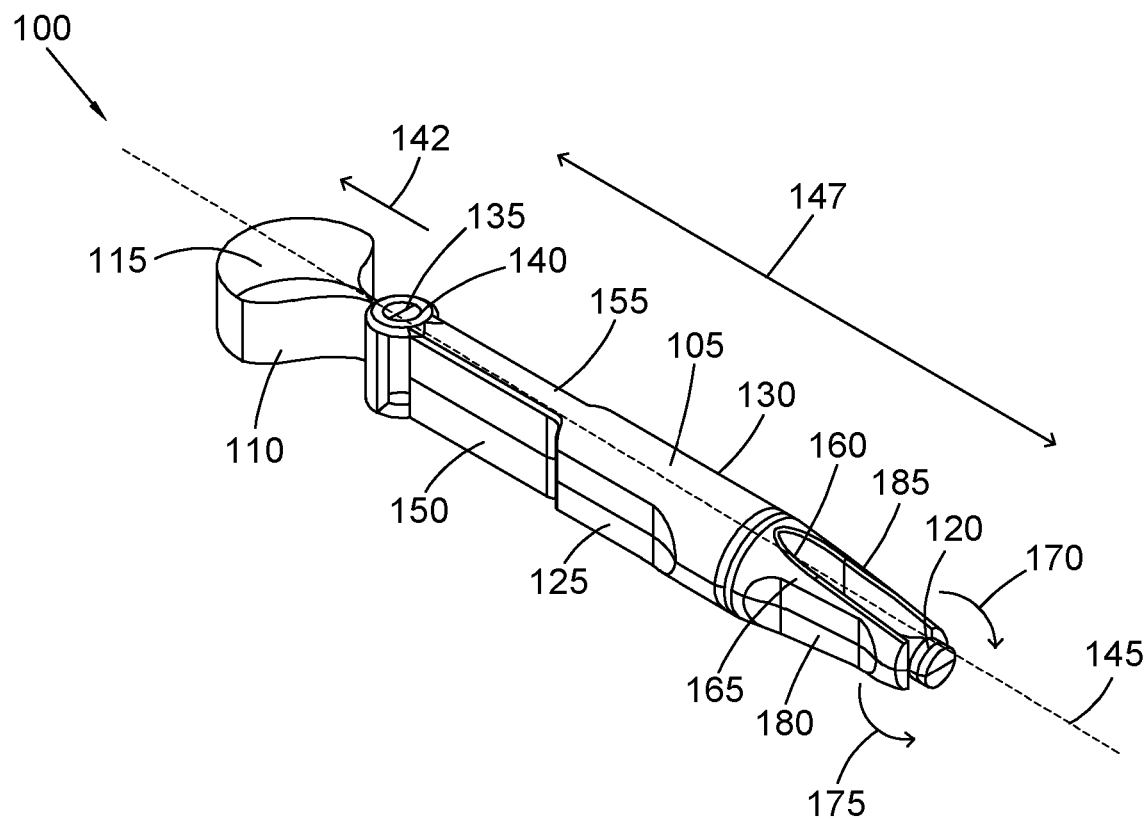
FIG. 1 schematically depicts a perspective view of a clamp for a tooth according to an embodiment of the invention.

FIG. 1 schematically depicts a perspective view of a clamp 100 for a tooth according to an embodiment of the invention. The clamp 100 comprises a body 105 for adjustably supporting a band 110 such that a looped section 115 of the band 110 projects from the clamp 100. In use, a dentist places the looped section 115 of the band 110 around a tooth that is to be treated. The body 105 is elongate and defines an axis 145 along which the body 105 generally extends. The body 105 is generally cylindrical and comprises first and second opposing flat portions 125, 130 which may be gripped by a dentist when the clamp 100 is being used. The clamp 100 further comprises a head 135 that is rotationally connected to the body 105 about an interference fit 140. A portion of the head 135 forms an interference fit 140 with a portion of the body 105 as described below. In the following discussion we will refer to this arrangement as the interference fit 140. The interference fit 140 is shown and discussed in greater detail with respect to FIGS. 7 and 8. The head 135 comprises a slot 265 (not visible in FIG. 1, see FIG. 3A) through which the looped section 115 of the band 110 projects. In the example of FIG. 1, the head 135 is in a centred position in which the looped section 115 of the band 110 projects from the slot 265 in a direction 142 that is substantially parallel to the axis 145 of the body 105. The head 135 may be rotated about the interference fit 140 into other positions which are herein referred to as angular positions (not shown in FIG. 1). Angular positions are positions in which the looped section 115 of the band 110 projects from the slot 265 in a direction that is not substantially parallel to the axis 145 of the body 105. The interference fit 140 is configured to allow the head 135 to be disposed in at least two different discrete angular positions on at least one side of the centred position. Angular positions of the head 135 with respect to the body 105 are shown and discussed in greater detail with respect to FIG. 8.

The body 105 tapers towards the head 135 and includes third and fourth opposing flat portions 150, 155. The third and fourth opposing flat portions 150, 155 house a flat section 250 (not visible in FIG. 1, see FIG. 3) of the band 110. The clamp 100 further comprises an actuator 160. The actuator 160 may be formed from a plastics material such as, for example, polypropylene. The actuator 160 is configured to alter an extent of the looped section 115 of the band 110. In the example of FIG. 1, the actuator 160 comprises a screw 230 (not visible in FIG. 1, see FIG. 2) and a handle 165 which forms a tail at an end of the body 105 of the clamp 100. The screw 230 may alternatively be referred to as a screw portion or a threaded portion (which may have an external thread). The handle 165 of the actuator 160 may comprise fifth and sixth opposing flat portions 180, 185 which may be gripped by the dentist when rotating the handle 165 to use the actuator 160 (relative to the body 105). The screw 230 is held by a screw thread 220, 225 (not visible in FIG. 1, see FIG. 2) formed within the body 105. The screw thread is shown and discussed in greater detail with respect to FIG. 2.

One end of the screw 230 (in particular an end of the screw distal from the handle 165) is attached to the flat section 250 of the band 110 within the body 105. As described further below with reference to FIG. 3, this attachment of an end of the screw 230 to the flat section 250 of the band 110 is achieved using a fastener 245. In use, a dentist may hold the body 105 in one hand and rotate the handle 165 of the actuator 160 (about the axis 145 relative to the body 105) with the other hand. Rotation of the actuator 160 in a first rotational direction 170 (e.g. clockwise) about axis 145 may cause the screw 230 to move along the inner screw thread 220, 225 and push the band 110 (along the axis 145) further out of the clamp 100 thereby increasing an extent of the looped section 115 of the band 110 that projects from the clamp 100. This allows the looped section 115 of the band 110 to receive, and fit around, larger teeth. Rotation of the actuator 165 in an opposite rotational direction 175 (e.g. anti-clockwise) about axis 145 may cause the screw 230 to move along the inner screw thread 220, 225 in the opposite direction (along axis 145) and pull the band 110 into the body 105 of the clamp 100 thereby reducing an extent of the looped section 115 of the band 110. This allows the looped section 115 of the band 110 to tighten around a tooth received within the looped section 115.

Once the looped section 115 of the band 110 has been adjusted to a desired extent, the dentist may then position the clamp 100 such that the looped section 115 of the band 110 fits around a tooth that is to be treated. The dentist may then introduce an amalgam between the tooth and a portion of the looped section 115 of the band 110 so as to fill a cavity in the tooth. Once the amalgam has set, it may be referred to as a filling. The looped section 115 of the band 110 may be held in place by the dentist while the amalgam sets. In the majority of cases, a dentist will also use an implement, which may be referred to as a wedge or an interproximal wedge, to adjust a shape of the looped section 115 of the band 110 around the tooth while holding the clamp 100 in place. Such adjustment of the shape of the looped section 115 of the band 110 may improve a shape of the filling formed in the cavity by maintaining pressure at a desired area of the looped section 115 of the band 110 and may at least partially account for the finite thickness of the band 110 when forming the filling. The clamp 100 of FIG. 1 advantageously comprises a removable implement 120 configured to adjust a shape of the looped section 115 of the band 110 once the removable implement 120 has been removed from the clamp 100. In the example of FIG. 1, the removable implement 120 forms part of the handle 165 of the actuator 160. In particular, the removable implement 120 is provided in an internal space of the handle 165 of the actuator 160. The removable implement 120 is shown and discussed in greater detail with respect to FIGS. 4-6.

Figure 2:
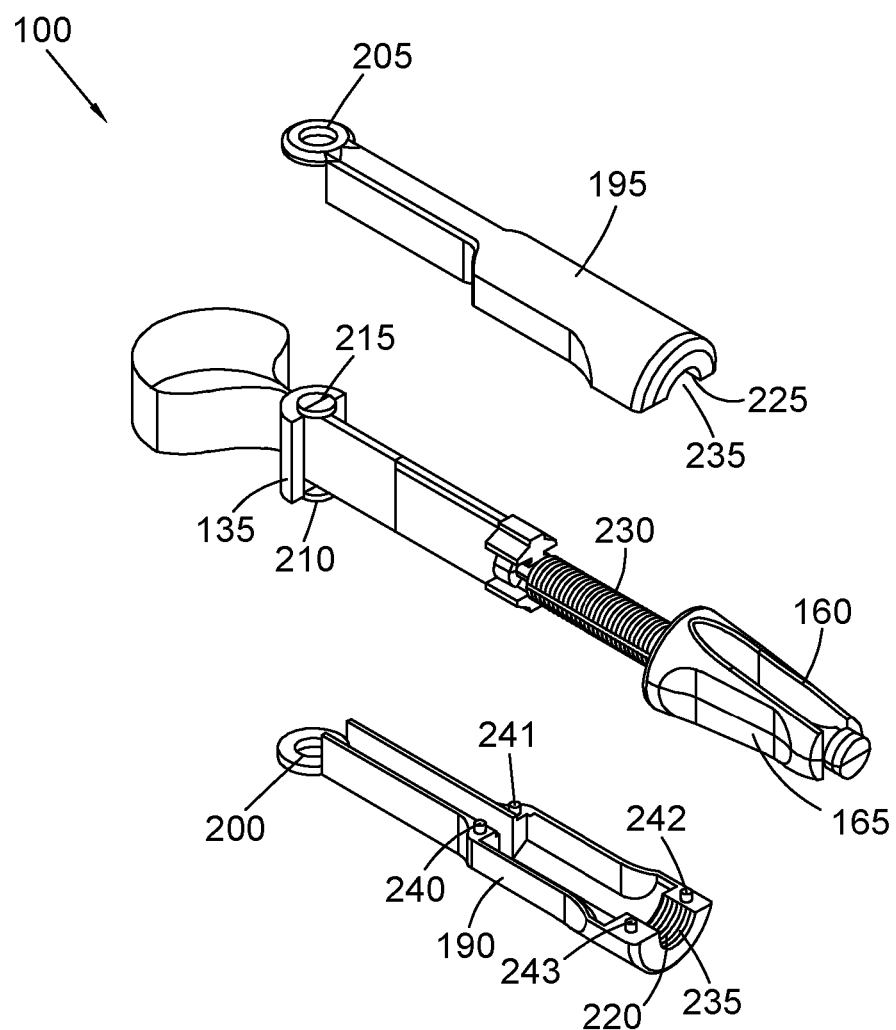
FIG. 2 schematically depicts an exploded perspective view of the clamp of FIG. 1.

FIG. 2 schematically depicts an exploded view of the clamp 100 shown in FIG. 1. The body 105 of the clamp 100 comprises a casing having two halves 190, 195. The casing may be formed from a plastic such as, for example, polypropylene. At one end of the casing (in particular at an end proximate the head 135 of the clamp 100) the two halves 190, 195 of the casing comprise opposing rings 200, 205. The head 135 comprises two pins 210, 215 configured to be inserted into the two rings 200, 205 of the casing. For this reason, the shape of the pins 210, 215 and the shape of the rings 200, 205 are complimentary. The head 135 may, for example, be formed from a plastic such as polypropylene. Once the pins 210, 215 of the head 135 have been inserted into the rings 200, 205 of the casing, the body and the head 135 can be considered to be rotationally connected to each other, in that the pins 210, 215 and rings 200, 205 arrangement allows rotation of the head 135 with respect to the body 105. It will be appreciated that this rotation of the head 135 with respect to the body 105 is about an axis that is perpendicular to the axis of the body 105. The pins 210, 215 and the rings 200, 205 form an interference fit with one another. The interference fit allows for the head 135 to be rotated (relative to the body 105) between and held stationary in different angular positions with respect to the body 105. In the example of FIG. 2, the pins 210, 215 on the head 135 are substantially circular pins 210, 215 about which the head 135 can rotate across and remain at any one of a substantially continuous range of angles between about −90° and about +90° relative to the body 105. Multiple forms of interference fit are shown and discussed in greater detail below with reference to FIG. 7.

At the opposite end of the casing (i.e. at an end of the casing proximate the actuator 160 of the clamp 100) the two halves 190, 195 of the casing comprise corresponding halves 220, 225 of an inner screw thread. The inner screw thread is configured to receive at least a portion of the screw 230 of the actuator 165. The two halves 220, 225 of the inner screw thread form an opening 235 at the end of the casing through which the actuator 160 projects. A first half 190 of the casing comprises protrusions 240-243 along its edge and a second half 195 of the casing comprises complimentary recesses (not shown) along its edge for receipt of the protrusions 240-243 of the first half 190. The two halves 190, 195 of the casing may fasten together in a snap-fit configuration. Alternatively and/or additionally the two halves 190, 195 of the casing may be welded together using, for example, sonic welding.

FIG. 3, consisting of FIGS. 3A-3C, schematically depicts perspective views of some of the components of the clamp 100 at different stages of construction (but with the body 105 not shown). FIG. 3A schematically depicts the band 110, the head 135, a fastener 245 and the actuator 160 detached from one another. The band 110 comprises a thin strip of metal such as, for example, stainless steel. The strip of metal may alternatively be referred to as a strap of metal. The strip may come in a variety of lengths, each of which may be useful for a different range of sizes of a patient's teeth. The strip may have a length of more than about 50 mm. The strip may have a length of less than about 100 mm. The strip may have a length of about 80 mm. The strip may have a thickness of between about 0.01 mm and about 0.1 mm, e.g. about 0.04 mm. The strip is folded in half to form the band 110. The band 110 comprises a flat section 250 in which two ends of the strip are pressed together and a looped section 115 in which the two folded halves of the strip separate from one another to form a loop which projects from the head 135 of the clamp 100. During use of the clamp 100, the looped section 115 is to be fitted around a tooth that is to be treated using the clamp 100. The strip of metal comprises a plurality of holes 260-263 at opposing ends of the strip. In the example of FIG. 3, the strip comprises four holes 260-263. The holes 260-263 are arranged on both ends of the strip such that when the strip is folded in half to form the band 110, a first hole 260 on a first end of the strip aligns with a second hole 261 on the other end of the strip and a third hole 262 on the first end of the strip aligns with a fourth hole 263 on the other end of the strip.

The head 135 of the clamp 100 comprises a slot 265 through which the looped section 115 of the band 110 projects. The head 135 has a generally hemicylindrical shape which may help allow the head 135 to rotate about the body of the clamp 100. The slot 165 is formed in a curved section of the hemicylindrical head 135. The two pins 210, 215 of the head 135 are formed on different opposed flat sections of the hemicylinder.

The fastener 245 is configured to fasten the band 110 at a first end whilst connecting to the actuator 160 at the opposing end. The fastener 245 may be formed from a plastic such as, for example, polypropylene. The fastener 245 comprises first and second plates 270, 275 which are connected together by a hinge 280. The plates 270, 275 may be formed from the same material and the hinge 280 may be a living hinge formed from a portion of the same material that connects the plates 270, 275 together. The first plate 270 includes a plurality of protrusions 282, 284 (visible in FIG. 3C). The second plate 275 includes an equal number of apertures 286, 288. In the example of FIG. 3, the first plate 270 includes two protrusions 282, 284 and the second plate 275 includes two apertures 286, 288 for receipt of the protrusions 282, 284. The protrusions 282, 284 of the first plate 270 are aligned with the apertures 286, 288 of the second plate 275 such that, when the second plate 275 is folded over the hinge 280 towards the first plate 270, the protrusions 282, 284 of the first plate 270 pass through the apertures 286, 288 of the second plate 275. The protrusions 282, 284 of the first plate 270 and the apertures 286, 288 of the second plate 275 may be sized and shaped so as to act as a snap-fit when they are brought together in order to fasten the first and second plates 270, 275 together. In this regard, the protrusions 282, 284 of the first plate 270 and the apertures 286, 288 of the second plate 275 may be thought of, and referred to, as snap-fit buttons.

During assembly, the flat section 250 of the band 110 may be passed through the slot 265 in the head 235 and the apertures 260-263 at both ends of the strip may be aligned with one another and the protrusions 282, 284 of the first plate 270 (this arrangement is shown in FIG. 3B). The protrusions 282, 284 of the first plate 270 may be passed through the apertures 260-263 of the flat section 250 of the band 110. In particular, the first hole 260 and the second hole 261 are aligned with and receive one protrusion 282 and the third hole 262 and the fourth hole 263 are aligned with and receive the other protrusion 280. The second plate 275 may then be folded over the hinge 280 towards the first plate 270 and the protrusions 282, 284 of the first plate 270 may pass through the apertures 286, 288 of the second plate 275 so as to clamp the band 110 in place between the first and second plates 270, 275 of the fastener 245.

The second end of the fastener 245 comprises a socket 290. The actuator 160 comprises a generally cylindrical plug 295. The socket 290 of the fastener 245 is configured to receive and hold the plug 295 of the actuator 160 so as to connect the actuator 160 to the fastener 245 (as is shown in FIGS. 3B and 3C). Inner dimensions of the socket 290 are such that the plug 295 can, in use, rotate about axis 145 within the socket 290 and such that the plug 295 cannot move significantly relative to the socket along the axis 145. The two halves of the casing (not shown in FIG. 3) may be brought together to enclose the flat section 250 of the band 110, the fastener 245 and at least a portion of the screw 230 of the actuator 160 (as shown in FIG. 1).

Figure 4A:
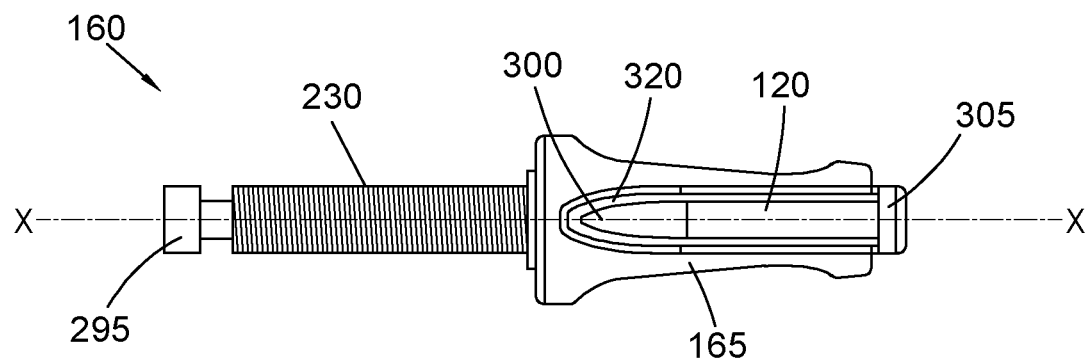
FIG. 4, consisting of FIG. 4A and FIG. 4B, schematically depicts different views of an actuator of a clamp comprising a removable implement according to an embodiment of the invention, which actuator may form part of the clamp shown in FIGS. 1 to 3.
Figure 4B:
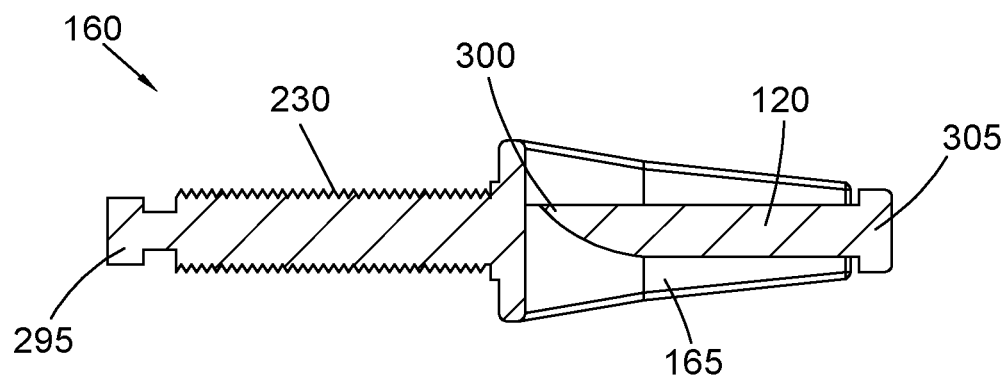

FIG. 4, consisting of FIGS. 4A and 4B, schematically depicts different views of the actuator 160 comprising the removable implement 120 according to an embodiment of the invention. FIG. 4A schematically depicts a view from the side of the actuator 160. FIG. 4B schematically depicts a cross-sectional view of the actuator 160 through the line X-X shown in FIG. 4A. The removable implement 120 forms part of the handle 165 of the actuator 160. The removable implement 120 is provided in an internal space 320 of the handle 165 of the actuator 160. The removable implement 120 tapers to a point at one end 300 for insertion of the removable implement 120 between a tooth and a portion of the looped section 115 of the band 110 when the clamp 100 is being used. The removable implement 120 includes a base portion 305 at an opposite end of to the end 300 at which the removable implement 120 tapers to a point. The base portion 305 may be referred to as a stud 305. The base portion 305 projects out of internal space 320 of the handle 165 of the actuator 160.

Figure 5:
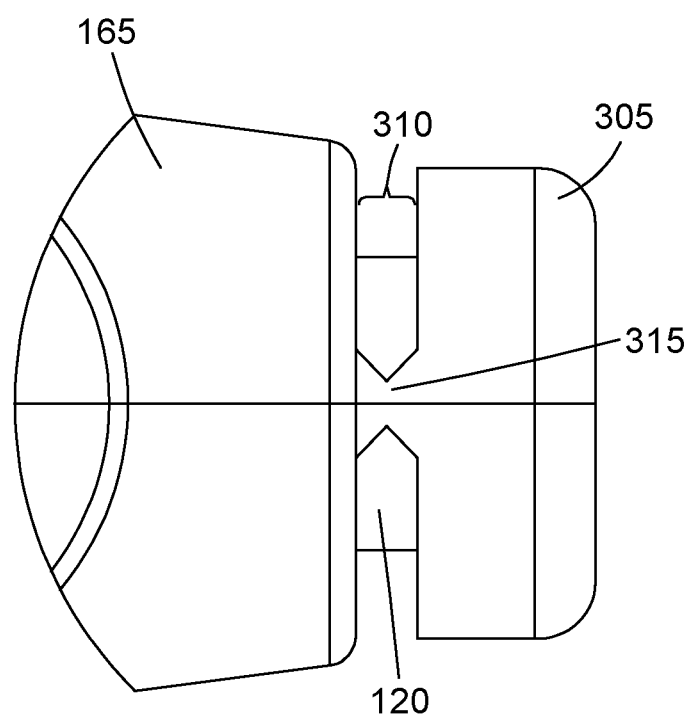
FIG. 5 schematically depicts a magnified view of an end portion of a handle of the actuator shown in FIG. 4.

FIG. 5 schematically depicts a magnified view of an end portion of the handle 165 of the actuator 160 shown in FIG. 4A but in a plane that is orthogonal to the plane of FIG. 4A (such that the internal space 320 of the handle 165 is not visible in FIG. 5). The removable implement 120 is connected to the handle 165 of the actuator 160 by a breakable connector 310. The breakable connector 310 may be formed from a plastic such as, for example, polypropylene. In the example of FIG. 5, the stud 305 of the removable implement 120 is connected to the handle 165 of the actuator by the breakable connector 310. It will be appreciated that the removable implement 120 and the handle 165 of the actuator 160 may be integrally formed as a single member from the same material (the breakable connector 310 comprising a relatively thin portion of said single member). The breakable connector 310 comprises material that becomes thinner at a breaking location 315 thereby forming a structural weakness at the breaking location 315. A user may remove the removable implement 120 from the handle 165 of the actuator 160 by applying force to the stud 315 of the removable implement 120 such that the breakable connector 310 breaks at the breaking location 315 thereby separating the removable implement 120 from the clamp 100.

Figure 6A:
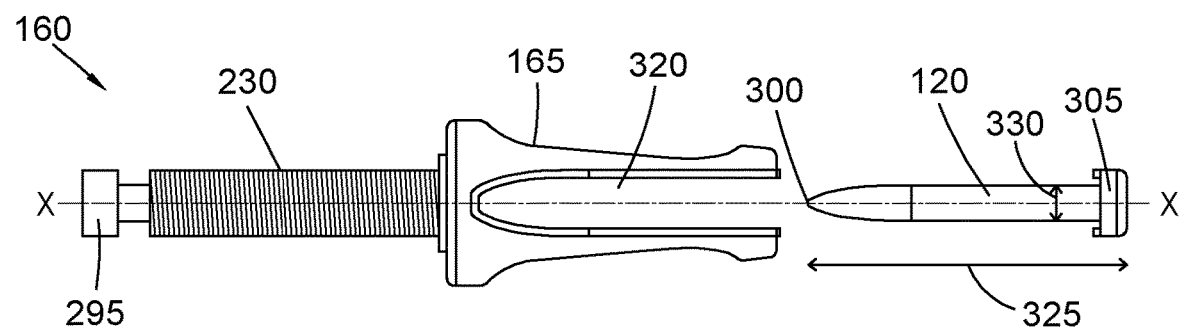
FIG. 6, consisting of FIGS. 6A and 6B, schematically depicts different views of the actuator of FIG. 4 after the removable implement has been removed from the handle of the actuator.
Figure 6B:
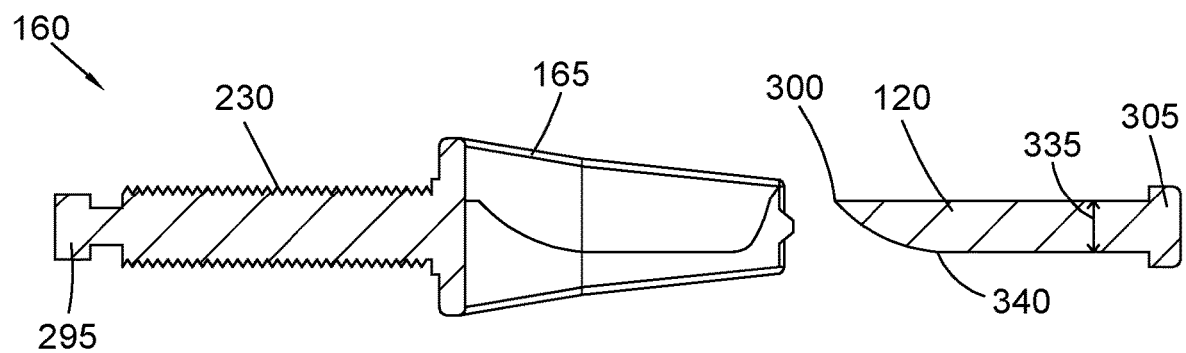

FIG. 6, consisting of FIGS. 6A and 6B, schematically depicts different views of the actuator 160 of FIG. 4 after the removable implement 120 has been removed from the handle 165 of the actuator 160. The removable implement 120 may have a length 325 of about 1 cm or more. The removable implement 120 may have a length 325 of about 5 cm or less. The removable implement 120 may have a length 325 of about 1.5 cm, or 2.0 cm, or 2.5 cm, or 3 cm, or 3.5 cm, or 4 cm, or 4.5 cm. A body of the removable implement may have a greatest width 330 of more than about 1 mm. The body of the removable implement may have a greatest width 330 of less than about 5 mm. The width of the body of the removable implement may reduce in size (i.e. taper) from the greatest width 330 to an end point 300 of the removable implement 120 at which the width of the removable implement 120 is substantially zero (e.g. about 0.1 mm). The body of the removable implement 120 may have a greatest height 335 of more than about 2 mm. The body of the removable implement 120 may have a greatest height 335 of less than about 5 mm. The body of the removable implement 120 may have a greatest height 335 of about 2.5 mm, or about 3 mm, or about 3.5 mm, or about 4 mm, or about 4.5 mm. The height of the body of the removable implement 120 may reduce in size (i.e. taper) from the greatest height 335 to an end point 300 of the removable implement 120 at which the height of the removable implement 120 is substantially zero (e.g. about 0.1 mm).

A base 340 of the removable implement 120 may curve towards the end point 300 of the removable implement 120. The removable implement 120 may be described as having a shape similar to that of a straightened claw. The removable implement 120 may be referred to as a dental wedge, an anatomical wedge or an interproximal wedge. Such wedges are used by dentists during many restorative dental procedures such as, for example, plastic restorations. For example, the wedge may be used to adapt the shape of the looped section of the band to a proximal part of a tooth cavity such that, once the cavity is filled with amalgam, the solidified amalgam has a desired shape with respect to the rest of the tooth and the surrounding teeth and gums. This may be achieved by inserting the end 300 of the removable implement 120 between the looped section 115 of the band 110 and an adjacent tooth.

The clamp 100 advantageously provides a single product having all implements that may be required by a dentist during such procedures, said implements being quickly and easily accessible. The removable implement 120 may be quickly and easily removed from the clamp 100 and used to improve a fit of the looped section 115 of the band 110 around the tooth, which would not be possible using known clamps.

FIG. 7, consisting of FIGS. 7A-F, schematically depicts magnified views from the side of different forms of interference fit 140 between the head 135 and the body 105 of the clamp 100 according to embodiments of the invention. As previously discussed, a portion of the head 135 forms an interference fit 140 with a portion of the body 105. The arrangement of the portion of the head 135 (i.e. the pin 215) and the portion of the body 105 (i.e. the ring 205) is herein referred to as the interference fit 140. The interference fit 140 comprises flexible and resilient material such that the head 135 can rotate relative to the body 105 about the interference fit 140. The interference fit 140 may be formed by components (e.g. the pins 210, 215 and the rings 200, 205) that comprise polypropylene which has been found to have a good degree of flexibility and resilience for providing the interference fit 140.

Figure 7A:
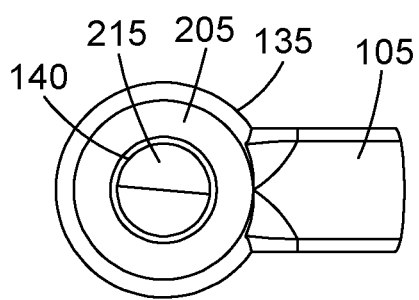
FIG. 7, consisting of FIGS. 7A-F, schematically depicts magnified views from the side of different forms of interference fit between the head and body of a clamp according to embodiments of the invention.

In the example of FIG. 7A, the interference fit 140 is formed between a substantially circular pin 215 about which the head 135 can rotate across and remain at any one of a substantially continuous range of angles between about −90° and about +90° relative to the body 105 of the clamp. That is, the interference fit 140 provides a suitable amount of friction between the pin 215 of the head 235 and the rings 205 of the body 105 such that a user may rotate the head 135 and thereby position the head 135 at any desired angular position relative to the body 105 within a semicircle of travel and, when the user releases the head 135, the interference fit 140 ensures that the head 135 remains at the desired angular position. In practice, the range of travel of the head 135 may be slightly less than a semicircle due to the presence of the band 110. For example, the range of travel of the head 135 relative to the body 105 may be about ±85°, ±75°, ±70°, etc. The range of movement of the head 135 relative to the body 105 is shown in FIG. 8.

Figure 7B:
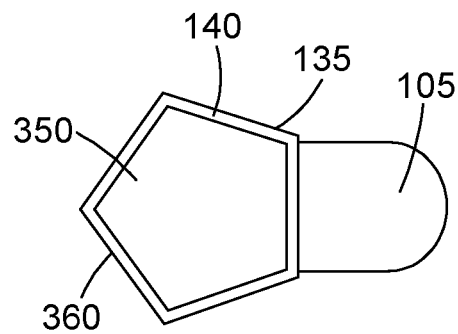
Figure 7C:
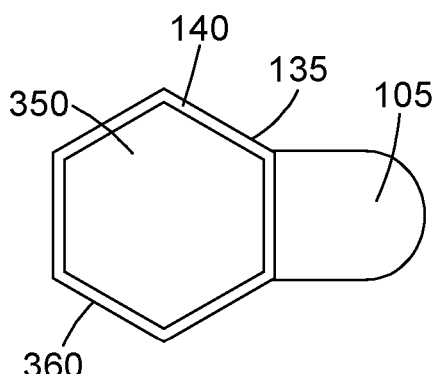
Figure 7D:
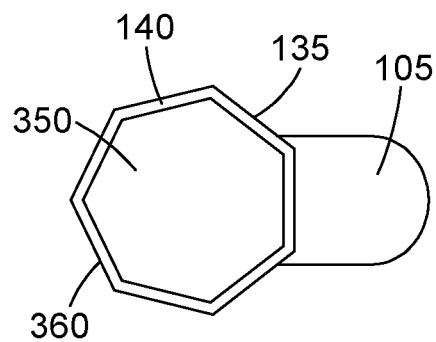
Figure 7E:
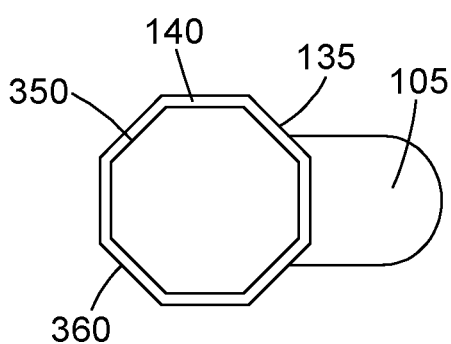

In the examples of FIGS. 7B-7F, the interference fit 140 is formed between a faceted pin 350 on the head 135 of the clamp and complimentarily faceted rings 360 on the body 105 of the clamp. The gap between the pin 350 of the head 135 and the ring 360 of the body 105 has been exaggerated in FIGS. 7B-E for clarity and ease of understanding. The faceted arrangement shown in FIG. 7F may also be referred to as a ribbed pin 350 and ribbed rings 360. The faceted pin 350 may be rotated relative to the faceted ring 360. Different facets (i.e. faces or sides) on the pin 350 correspond to different angular positions of the head 135. That is, each time the pin 350 is rotated such that the facets of the pin 350 align with the facets of the ring 360, the head 135 may remain in that angular position until the head 135 is rotated again by a user. In general, the greater the number of facets or ribs there are on the pin 350 and rings 360, the greater the number of available angular positions of the head 135 there are relative to the body 105. In general, the smaller the distance between neighbouring facets or ribs on the pin 350 and rings 360, the greater the precision with which the angular position of the head 135 may be changed. The faceted structure of the pin 350 and ring 360 arrangement may take a variety of forms. In cross section, the pin 350 and ring 360 have shapes that may generally be referred to as polygons having a desired number and/or size of facets or ribs to achieve a desired number of angular positions and angular positioning precision of the head 135 relative to the body 105. For example, the pin 350 and the rings 360 may be faceted such that, in cross section, they are generally pentagonal (as shown in FIG. 7B), generally hexagonal (as shown in FIG. 7C), generally heptagonal (as shown in FIG. 7D), generally octagonal (as shown in FIG. 7E), etc.

Figure 7F:
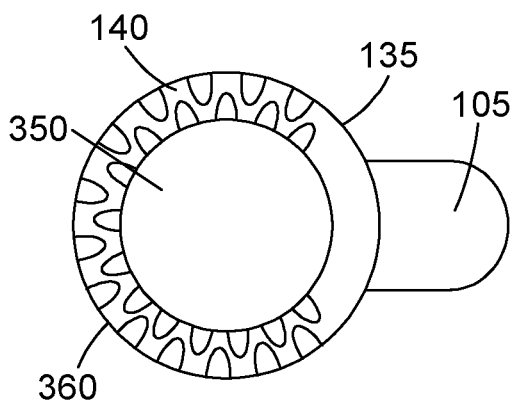

FIG. 7F depicts a pin 350 comprising a plurality of ribs 385 forming an interference fit 140 with a ring 360 comprising a plurality of ribs 380. The ribs 385 of the pin 350 and the ribs 380 of the ring 360 interdigitate with one another in each angular position of the head 135. The pin 350 may be rotated within the ring 360 such that the ribs 385 of the pin 350 and the ribs 380 of the ring 360 deform as they move past one another until the ribs 380, 385 interdigitate with one another again such that the head 135 is in a different angular position.

Figure 8A:
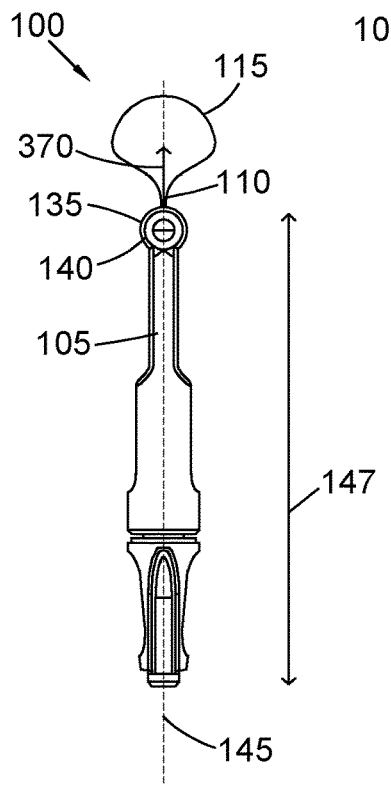
FIG. 8, consisting of FIGS. 8A-E, schematically depicts views from the side of a clamp according to an embodiment of the invention in which the head of the clamp is located in different rotational positions relative to the body; and, FIG. 9, consisting of FIGS. 9A and 9B, schematically depicts pins of the head of the clamp and a ring of a body of the clamp according to an embodiment of the invention.

FIG. 8, consisting of FIGS. 8A-E, schematically depicts views from the side of a clamp 100 according to an embodiment of the invention with the head 135 located in different rotational positions relative to the body 105. As previously discussed, the head 135 is rotationally connected to the body 105 by an interference fit 140, and the head 135 comprises a slot through which a looped section 115 of the band 110 projects from the clamp 100 for fitting around a tooth. FIG. 8A schematically depicts the head 135 in a centred position relative to the body 105 in which the looped section 115 of the band 110 projects from the clamp 100 in a direction 370 that is substantially parallel to the axis 145 of the body 105. When we discuss a direction in which the looped section 115 of the band 110 projects from the clamp 100, we are referring to the direction in which the slot 265 of the head 135 is facing. A length 147 of the body 105 may be considered to be the greatest of the three dimensions of the body 105, and generally defines the axis 145 along the body 105.

Figure 8B:
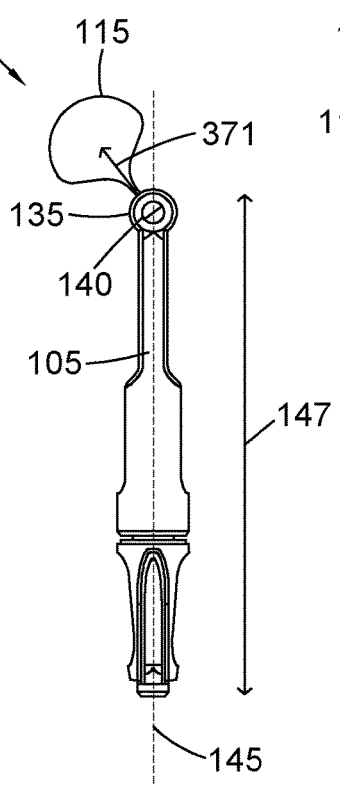
Figure 8C:
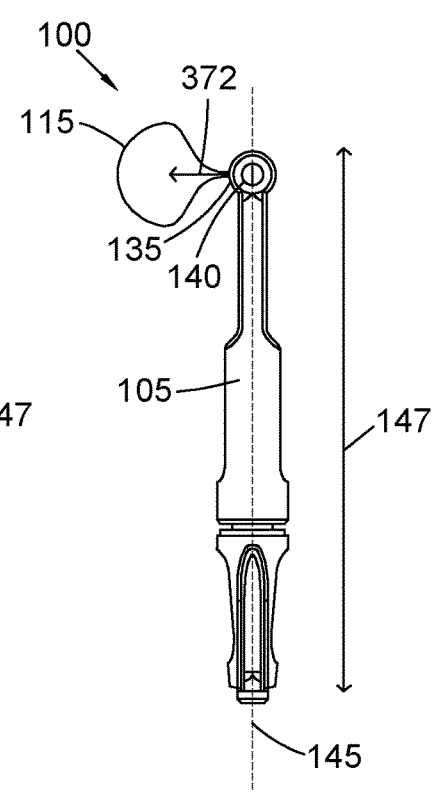
Figure 8D:
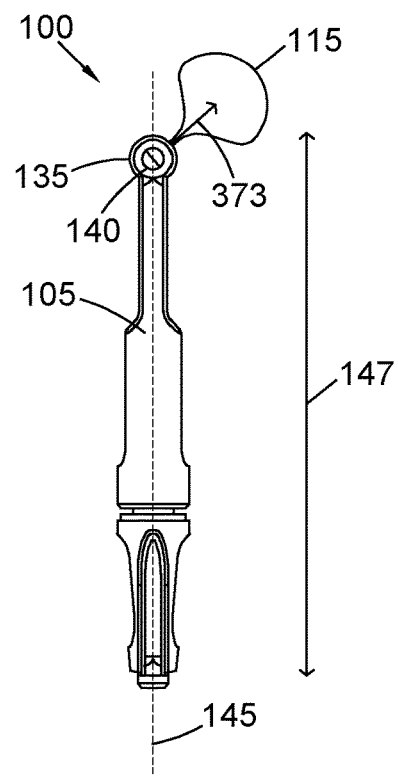
Figure 8E:
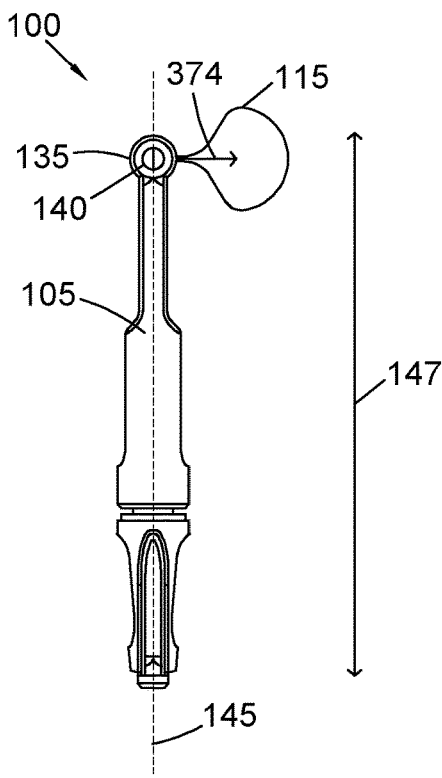

FIGS. 8B-E show the head 135 in different angular positions in which the looped section 115 of the band 110 projects from the clamp 100 in directions 371-374 that are not substantially parallel to the axis 145 of the body 105. In the example of FIG. 8B, the head 135 has been rotated to a first angular position in which the looped section 115 of the band 110 projects from the clamp 100 in a direction 371 that is about 45° anti-clockwise from the centred position shown in FIG. 8A. The interference fit 140 between the head 135 and the body 105 ensures that the head 135 stays in the first angular position once the user has stopped applying a rotational force to the head 135. In the example of FIG. 8C, the head 135 has been further rotated to a second angular position in which the looped section 115 of the band 110 projects from the clamp 100 in a direction 372 that is about 90° anti-clockwise from the centred position shown in FIG. 8A. The interference fit 140 between the head 135 and the body 105 ensures that the head 135 stays in the second angular position once the user has stopped applying a rotational force to the head 135. In the example of FIG. 8D, the head 135 has been rotated in the opposite rotational direction to a third angular position in which the looped section 115 of the band 110 projects from the clamp 100 in a direction 373 that is about 45° clockwise from the centred position shown in FIG. 8A. The interference fit 140 between the head 135 and the body 105 ensures that the head 135 stays in the third angular position once the user has stopped applying a rotational force to the head 135. In the example of FIG. 8E, the head 135 has been further rotated to a fourth angular position in which the looped section 115 of the band 110 projects from the clamp 100 in a direction 374 that is about 90° clockwise from the centred position shown in FIG. 8A. The interference fit 140 between the head 135 and the body 105 ensures that the head 135 stays in the fourth angular position once the user has stopped applying a rotational force to the head 135.

Although FIG. 8 only shows five examples of different rotational positons of the head 135 relative to the body 105 of the clamp 100, it will be understood that the head 135 of the clamp 100 of FIG. 8 may be positioned at any one of a substantially continuous range of angles between about −90° and about +90° relative to the body 105 of the clamp 100.

The interference fit 140 between the head 135 and the body 105 of the clamp 100 provides for at least two different angular positions of the head 135 on at least one side of the centred position shown in FIG. 8A. For example, FIGS. 8B and 8C show the head 135 at two different angular positions on the left-hand side (i.e. in an anti-clockwise rotational direction) of the centred position shown in FIG. 8A. As a further example, FIGS. 8D and 8E show the head 135 at two different angular positions on the right-hand side (i.e. in a clockwise rotational direction) of the centred position shown in FIG. 8A.

Known clamps comprising a rotatable head may only be able to move between three discrete locked positions relative to the body: a centred position, a clockwise position and an anti-clockwise position. The rotational freedom of the head of the known disposable clamps may be to these three discrete locked positions, thereby restricting freedom of use of the clamp by the dentist. The interference fit 140 advantageously provides greater flexibility of use of the clamp 100 by offering a greater number of rotational positions of the head 135 compared to known clamps. The interference fit 140 increases the dentist's ability to adapt the looped section 115 of the band 110 to different patients' teeth and thereby improves the ease with which the clamp 100 may be used compared to known clamps.

Figure 9A:
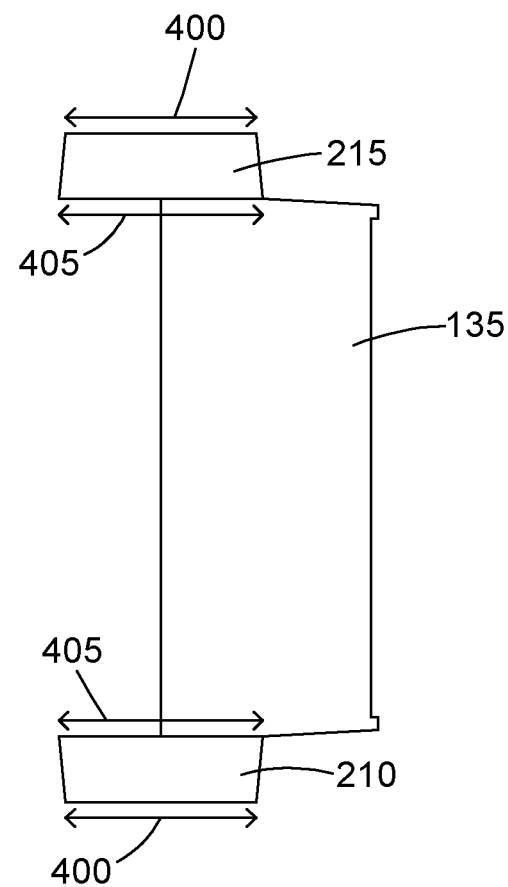
Figure 9B:
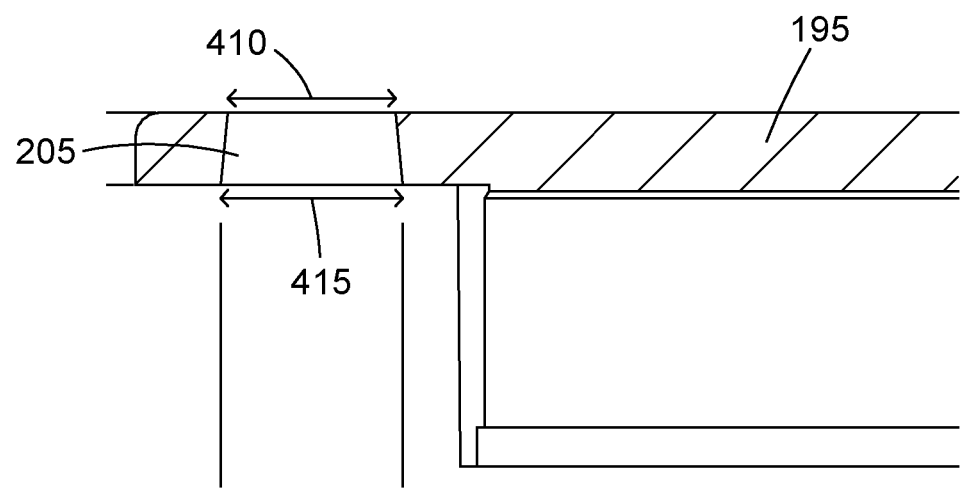

FIG. 9, consisting of FIGS. 9A and 9B, schematically depicts the pins 210, 215 of the head 135 of the clamp 100 and a ring 205 of the body 105 of the clamp 100 according to an embodiment of the invention. FIG. 9A schematically depicts a view from the side of the head 135 of the clamp 100. FIG. 9B schematically depicts a cross-sectional view from the side of a portion of one half 195 of the casing of the body 105 of the clamp 100. One of the pins 215 shown in FIG. 9A is configured to be received in the ring 205 shown in FIG. 9B to thereby form the interference fit between the head 135 and the body 105 of the clamp 100. The pins 210, 215 of the head 135 taper along their axes such that the diameter of the pins 210, 215 increases when travelling towards a central portion of the head 135. The taper may assist in assembly of the clamp 100. That is, the taper of the pins 210, 215 may make it easier to insert the pins 210, 215 in the rings 200, 205 when forming the interference fit between the head 135 and the body 105.

The head 135, along with other components of the clamp 100 such as the casing 190, 195, the actuator 160 comprising the removable implement 120 and the fastener 245, may be formed by injection moulding plastics material, such as polypropylene, into a mould made of, for example, metal. The mould may be an inverse or negative image of the component (e.g. the head 135) such that when the mould is filled with the plastics material and the plastics material is allowed to set, the component (e.g. the head 135) is formed within the mould. When the mould is first formed, the portion of the mould that corresponds to the pins 210, 215 may be substantially the same size as the portion of the mould that corresponds to the rings 200, 205. The portion of the mould that corresponds to the pins 210, 215 may be further machined to remove some material and thereby slightly increase a size of the pins 210, 215 and/or to create the taper of the pins 210, 215 that result from the injection moulding process. This in turn may assist in forming a suitable interference fit between the pins 210, 215 and the rings 200, 205. This technique of removing some of the mould material may be referred to as a tool-safe mould change.

The pins 210, 215 may, for example, have a smallest diameter 400 of about 1 mm or more. The pins 210, 215 may, for example, have a smallest diameter 400 of about 3 mm or less. The pins 210, 215 may, for example, have a smallest diameter 400 of about 2.5 mm. The pins 210, 215 may, for example, have a greatest diameter 405 of about 2 mm or more. The pins 210, 215 may, for example, have a greatest diameter 405 of about 4 mm or less. The pins 210, 215 may, for example, have a greatest diameter 405 of about 2.7 mm.

The rings 200, 205 of the head 135 taper along their axes such that the diameter of the rings 200, 205 increases when travelling towards a region which receives the head 135. The taper may assist in assembly of the clamp 100. That is, the taper of the rings 200, 205 may make it easier to insert the pins 210, 215 in the rings 200, 205 when forming the interference fit between the head 135 and the body 105.

The rings 200, 205 may, for example, have a smallest diameter 410 of about 1 mm or more. The rings 200, 205 may, for example, have a smallest diameter 410 of about 3 mm or less. The rings 200, 205 may, for example, have a smallest diameter 410 of about 2.9 mm. The rings 200, 205 may, for example, have a greatest diameter 415 of about 2 mm or more. The rings 200, 205 may, for example, have a greatest diameter 415 of about 4 mm or less. The rings 200, 205 may, for example, have a greatest diameter 415 of about 3.0 mm.

The tapered diameters of the pins 210, 215 may be slightly smaller than the tapered diameters of the rings 200, 205 whilst still providing an interference fit. For example, the tapered diameters of the pins 210, 215 may be up to about 0.3 mm less than the tapered diameters of the rings 200, 205. Alternatively, the tapered diameters of the pins 210, 215 and the tapered diameters of the rings 200, 205 may be substantially the same. Alternatively, the tapered diameters of the pins 210, 215 may be slightly greater than the tapered diameters of the rings 200, 205. For example, the tapered diameters of the pins 210, 215 may be up to about 0.3 mm greater than the tapered diameters of the rings 200, 205. In any case, the tapered diameters of the pins 210, 215 and the tapered diameters of the rings 200, 205 are similar enough such that, when they are assembled, an interference fit forms between the pins 210, 215 and the rings 200, 205 which allows a user to rotate the head 135 about the body 105 and allows the head 135 to remain at a desired angular position relative to the body 105 once the user has released the head 135.

A method of manufacturing the clamp 100 discussed and depicted herein may comprise forming the removable implement as part of the clamp 100. For example, part of the clamp 100 (for example the actuator 160) and the removable implement 120 may be formed by injection moulding. For example, when the removable implement 120 forms part of the handle 165 of the actuator 160, the actuator 160, the removable implement 120 and the breakable connector 310 in-between may all be formed by injection moulding using a single cast. The method of manufacture may further comprise tapering the removable implement 120 at one end for insertion of the removable implement 120 between a tooth and the looped section 115 of the band 110.

The method of manufacture of the clamp 100 may additionally or alternatively comprise forming a head 135 comprising a slot 265 through which a looped section 115 of the band 110 projects and rotationally connecting the head 135 to the body 105 using an interference fit 140 which provides for at least two different angular positions on at least one side of a centred position of the head 135. Using an interference fit 140 may comprise providing a substantially circular pin 215 about which the head 135 can rotate across and remain at any one of a substantially continuous range of angles between about −90° and about +90° relative to the body 105. The components used to form the interference fit 140 may comprise polypropylene.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

The invention claimed is:

1. A clamp for a tooth comprising:
a body for adjustably supporting a band such that a looped section of the band projects from the clamp; and,
a head that is rotationally connected to the body by an interference fit, the head comprising a slot through which the looped section of the band projects, wherein the interference fit is arranged to maintain the head at any one of: a centred position in which the looped section of the band projects from the slot in a direction that is substantially parallel to a length of the body; and a plurality of angular positions in which the looped section of the band projects from the slot in a direction that is not substantially parallel to the length of the body, wherein the interference fit is arranged such that the head may be maintained in at least two different angular positions on at least one side of the centred position,
wherein the body comprises rings and the head comprises pins configured to be received in the rings to thereby form the interference fit between the head and the body,
and wherein the pins and the rings taper in the same direction along their axes.

2. The clamp of claim 1, wherein the interference fit comprises a substantially circular pin which allows the head to rotate across and remain at any one of a substantially continuous range of angles between about −90° and about +90° relative to the body.

3. The clamp of claim 1, further comprising a removable implement configured to adjust a shape of the looped section of the band once the removable implement has been removed from the clamp,
and wherein the removable implement tapers at one end for insertion of the removable implement between a tooth and the looped section of the band.

4. A kit of parts comprising:
a clamp according to claim 1; and,
a band configured to be attached to the clamp.

5. A method of manufacturing a clamp for a tooth, the clamp comprising a body for adjustably supporting a band such that a looped section of the band projects from the clamp, the method comprising forming a head that is rotationally connected to the body by an interference fit, the head comprising a slot through which the looped section of the band projects, wherein the interference fit is arranged to maintain the head at any one of: a centred position in which the looped section of the band projects from the slot in a direction that is substantially parallel to a length of the body; and a plurality of angular positions in which the looped section of the band projects from the slot in a direction that is not substantially parallel to the length of the body, wherein the interference fit is arranged such that the head may be maintained in at least two different angular positions on at least one side of the centred position,
wherein the body comprises rings and the head comprises pins configured to be received in the rings to thereby form the interference fit between the head and the body,
and wherein the pins and the rings taper in the same direction along their axes.

6. The method of claim 5, wherein using an interference fit comprises providing a substantially circular pin which allows the head to rotate across and remain at any one of a substantially continuous range of angles between about −90° and about +90° relative to the body.

7. The method of claim 5, further comprising using components comprising polypropylene to form the interference fit.

8. The method of claim 5, further comprising forming a removable implement as part of the clamp, the removable implement being configured to adjust a shape of the looped section of the band once the removable implement has been removed from the clamp.

9. A clamp for a tooth comprising:
a body for adjustably supporting a band such that a looped section of the band projects from the clamp;
a removable implement configured to adjust a shape of the looped section of the band once the removable implement has been removed from the clamp; and
an actuator configured to alter an extent of the looped section of the band,
wherein the removable implement forms part of the actuator, and
wherein the removable implement is a dental wedge.

10. The clamp of claim 9, wherein the removable implement tapers at one end for insertion of the removable implement between a tooth and the looped section of the band.

11. The clamp of claim 9, wherein the removable implement has a length of between about 1 cm and about 5 cm.

12. The clamp of claim 9,
wherein the removable implement is connected to the clamp by a breakable connector.

13. The clamp of claim 9, further comprising
a head that is rotationally connected to the body by an interference fit, the head comprising a slot through which the looped section of the band projects, wherein the interference fit is arranged to maintain the head at any one of: a centred position in which the looped section of the band projects from the slot in a direction that is substantially parallel to a length of the body; and a plurality of angular positions in which the looped section of the band projects from the slot in a direction that is not substantially parallel to the length of the body, wherein the interference fit is arranged such that the head may be maintained in at least two different angular positions on at least one side of the centred position.

14. The clamp of claim 13, wherein the interference fit comprises a faceted pin, wherein different facets on the faceted pin correspond to different angular positions of the head.

15. The clamp of claim 13, wherein the interference fit comprises a substantially circular pin which allows the head to rotate across and remain at any one of a substantially continuous range of angles between about −90° and about +90° relative to the body, and/or wherein the interference fit is formed by components comprising polypropylene.

16. A method of manufacturing a clamp for a tooth, the clamp comprising:

a body for adjustably supporting a band such that a looped section of the band projects from the clamp; and, an actuator configured to alter an extent of the looped section of the band, the method comprising:

forming a removable implement as part of the actuator, the removable implement being configured to adjust a shape of the looped section of the band once the removable implement has been removed from the clamp, wherein the removable implement is a dental wedge.

17. The method of claim 16, further comprising tapering the removable implement at one end for insertion of the removable implement between a tooth and the looped section of the band.

18. The method of claim 16, further comprising injection moulding the clamp and the removable implement, and/or further comprising forming a breakable connector between the removable implement and the clamp.

19. The method of claim 16, further comprising forming a head that is rotationally connected to the body by an interference fit, the head comprising a slot through which the looped section of the band projects, wherein the interference fit is arranged to maintain the head at any one of: a centred position in which the looped section of the band projects from the slot in a direction that is substantially parallel to a length of the body; and a plurality of angular positions in which the looped section of the band projects from the slot in a direction that is not substantially parallel to the length of the body, wherein the interference fit is arranged such that the head may be maintained in at least two different angular positions on at least one side of the centred position.

20. The method of claim 19, wherein using an interference fit comprises providing a substantially circular pin which allows the head to rotate across and remain at any one of a substantially continuous range of angles between about −90° and about +90° relative to the body, and/or further comprising using components comprising polypropylene to form the interference fit.

* * * * *